W. M. NORCROSS.
LAWN TRIMMER.
APPLICATION FILED SEPT. 13, 1912.
1,072,151.
Patented Sept. 2, 1913.
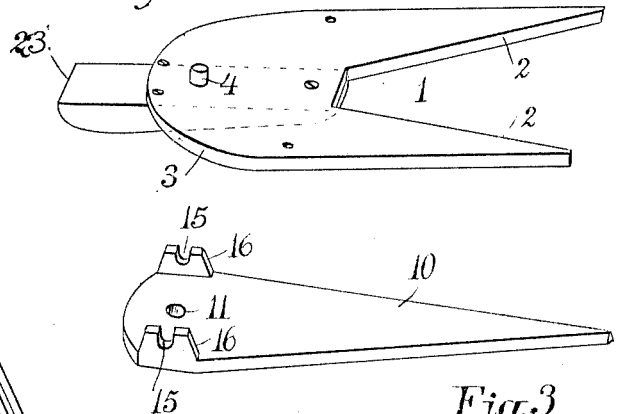
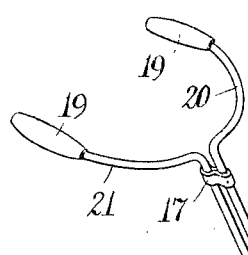
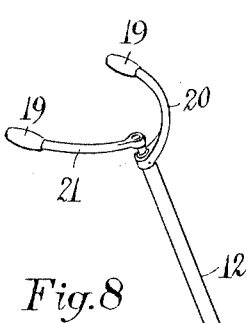
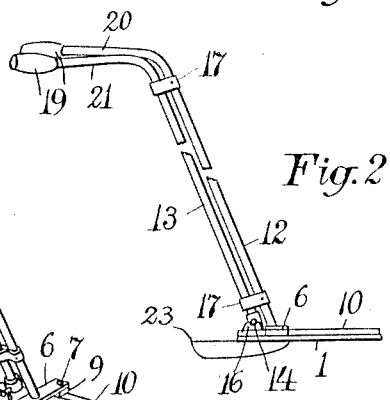
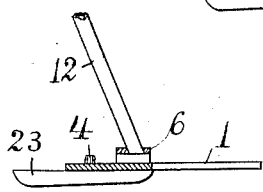
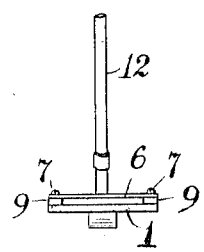
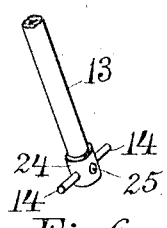
Witnesses
E. W. Churchill
Norman MacLaffin
Inventor,
William M. Norcross;
By A. B. Upham
Attorney.

UNITED STATES PATENT OFFICE.

WILLIAM M. NORCROSS, OF BOSTON, MASSACHUSETTS.

LAWN-TRIMMER.

1,072,151.    Specification of Letters Patent.    Patented Sept. 2, 1913.

Application filed September 13, 1912.   Serial No. 720,200.

*To all whom it may concern:*

Be it known that I, WILLIAM M. NORCROSS, a citizen of the United States, and a resident of Boston, in the county of Suffolk and Commonwealth of Massachusetts, have invented certain new and useful Improvements in Lawn-Trimmers, of which the following is a full and exact description.

The object of this invention is the construction of a simple, light, inexpensive and conveniently operated device for cutting the stems of grass left after a lawn mower has past over the same; for trimming the edges of walks; for cutting grass beside fences and walls and about posts and trees, and upon steep embankments, and for doing other work of like character.

In the drawings forming part of this specification, Figure 1 is a perspective view of a lawn-trimmer embodying my invention. Fig. 2 is a side elevation of the same, with a part thereof broken out. Fig. 3 is a perspective view on a larger scale of the movable cutter blade. Fig. 4 is a perspective view of the stationary cutter blade. Fig. 5 is an end view of the blades and associated parts. Fig. 6 is a perspective view of the lower end of the rocker shaft for the operation of the movable cutter blade. Fig. 7 is a side sectional elevation of the stationary cutter blade and connected parts. Fig. 8 is a perspective view of the upper part of a modified form of the invention.

I prefer to form the stationary cutting member 1 with but two blades 2 spaced at their juncture with the body portion 3, although I do not restrict myself to such number, as one alone or several can be employed with nearly equal benefit. Near the rear of the body 3 rises a stud 4, as shown in Fig. 4; and as shown in Figs. 1 and 5, a strap 6 is fastened across said body a short distance above the latter, preferably by screws 7, small blocks 9 being introduced between the strap and body. Beneath said strap and kept thereby in close coaction with the stationary cutting member, is the movable cutting member consisting preferably of a single blade 10 made double-edged and formed with an eye 11 fitted to the stud 4. Said blades being relatively oscillated, whatever grass and weeds come between their edges are immediately snipped off. For such oscillation, I provide two parallel rods, either one behind the other as shown in Fig. 1, or one within the other as shown in Fig. 8; one of which rods is connected with the stationary member, and the other of which rods is connected with the movable cutting member.

I prefer to connect the stationary member with the rod 12 by fastening the end of the latter to the strap 6 in any suitable manner, as by inserting the end of the rod within a hole in the strap and brazing it therein. Fig. 7. For the connection of the movable cutting member with its rod 13, the latter is provided at its lower end with oppositely projecting pins 14 (Fig. 6) adapted to rest in the notches 15 in ears 16 rising from the movable member. An oscillation or rocking motion being given to said rod 13, the cutting blade is swung laterally back and forth and made to coact with the stationary member in the desired way. Where the rods are located exterior to each other, the rod 12 is provided with two strap-bearings 17 rigid therewith adapted to receive the rod 13 loosely therein.

For the actuation of the rod 13 and the control of the entire device, each rod is formed with a handle bar, terminating in a grip 19. These handle bars are preferably integral with the rods as shown in Fig. 1, but may be separable therefrom as illustrated in Fig. 8. They are preferably located in the same plane and one substantially parallel with the cutting members, as shown in Fig. 2; the bar 20 extending from the rod 12 toward the left of the user, and the bar 21 extending toward the right. Said handle bars do not need to be very long, six inches being ample for each, although the drawings might be thought to illustrate a much greater length.

In the use of this trimming device, the person grasps the handle bars in his hands, and holding the left hand one with comparative firmness, rapidly vibrates the one at his right hand, giving thereby the desired relative oscillation to the cutting blades. By tilting the device backward or forward upon the wooden runner or heel 23, the cutting edges of the blades are elevated or depressed so as to give a long or a short trim to the grass, as desired.

The entire apparatus is very light and can be moved along the surface of a lawn, or up a steep embankment, or carried along upon a lateral edge with the blades nearly vertical, or presented to trim off twigs of shrubs, with the greatest ease and handiness.

The pins 14 are preferably carried by a cap 24 removably slipped upon the end of the rod 13 and held in place thereon by a screw 25. This cap is removed only when it is desired to withdraw the rod from its bearings 17. For swinging the handle bars together for compactness in storage, the rod 13 is drawn upward enough to permit the pins 14 to be disengaged from the notches 15, and then the handle bars can be freely brought together. In use, the weight of the rod 13 and its handle bar is sufficient to retain said pins in said notches.

When it is wished to sharpen the cutting members, the screws 7 are removed and the strap 6 displaced, after which the blades are readily separated and reground.

What I claim as my invention and for which I desire Letters Patent is as follows, to wit:—

1. The combination with two coacting cutting blades, of two parallel rods operatively connected with said blades and rising therefrom to a suitable height, said rods being relatively rotative and having their axes fixed relative to each other, the upper ends of said rods having each a single operating handle bar, the handle bar of one rod curving toward the right and the handle bar of the other rod curving toward the left, and both said handle bars being in the same substantially horizontal plane when said blades are in their customary operative position.

2. A lawn trimmer comprising a stationary cutting member, a movable cutting member, a rod rigidly connected with the first-named cutting member, a rod rotatively supported by the first-named rod and having lateral projections at its lower end, and operative means for said rods, the second-named cutting member having notched ears adapted to be entered by said lateral projections for the oscillation of the last-named member.

In testimony that I claim the foregoing invention, I have hereunto set my hand this 10th day of September, 1912.

WILLIAM M. NORCROSS.

Witnesses:
A. B. UPHAM,
H. L. WHITTLESEY.

---

Copies of this patent may be obtained for five cents each, by addressing the "Commissioner of Patents, Washington, D. C."